April 5, 1960 R. H. GAPP 2,931,532
RIVETS AND METHOD OF RIVETING
Filed April 25, 1955 2 Sheets-Sheet 1

INVENTOR.
ROLAND HOWARD GAPP
BY George B White
ATTY

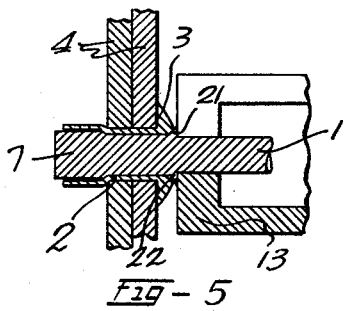
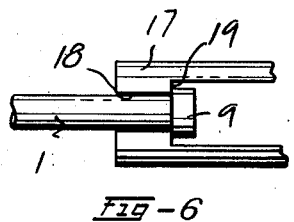
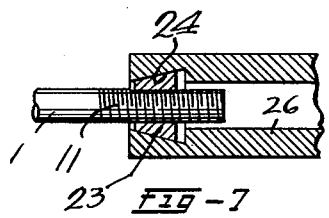
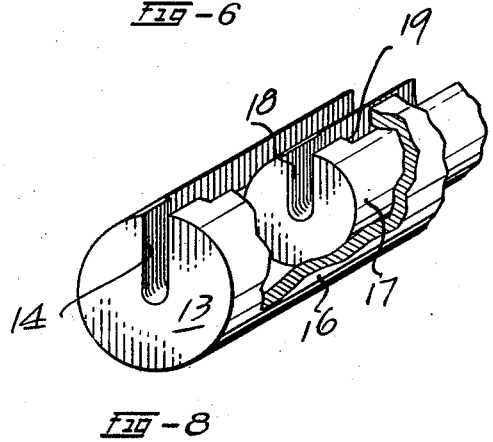
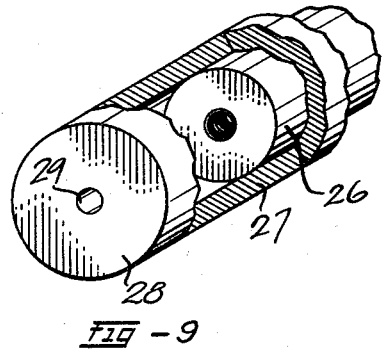
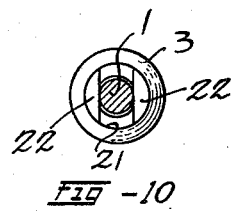
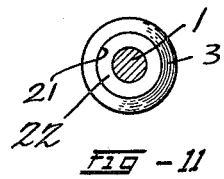

United States Patent Office 2,931,532
Patented Apr. 5, 1960

2,931,532

RIVETS AND METHOD OF RIVETING

Roland Howard Gapp, Santa Ana, Calif., assignor to Townsend Company, a corporation of Pennsylvania Application April 25, 1955, Serial No. 503,448

3 Claims. (Cl. 218—29)

This invention relates to rivets and method of riveting, and particularly the type of blind rivets wherein the stem is pulled through a tubular rivet in such a manner as to expand the tail of the tubular rivet for clinching the work.

The particular type of rivets herein described is generally referred to as blind rivet because it can be applied from the outside or one side of the work. The general elements of such rivets are: a tubular rivet with a head on one end and a stem which extends through the tubular rivet and which has an enlargement or head on its blind end or inner end so that when the stem is pulled through the tubular rivet while the head of the tubular rivet is held against the work, the blind head of the stem expands the tail of the tubular rivet against the work.

The object of the present invention is to improve the action of such blind rivets by providing an assembly and steps of operation whereby the expansion of the tubular rivet is controlled and the tendency of the tubular rivet to split or crack during expansion is eliminated, yet high clinching action is developed for drawing work or sheets closer together.

Another object of the invention is to provide a rivet assembly and steps of riveting whereby the rivet of the same length can be used in works wherein the material thickness varies over a wide range, yet rivet strength is not sacrificed, and whereby the tubular rivet is expanded so as to fill the hole in the sheet or work, and to provide for locking the stem in the tubular rivet after the same is set.

Particular features of this invention include pulling a stem through a tubular rivet so as to pull an elongated blind head into the tubular rivet in the work so that the blind head first expands the tubular rivet wall against the blind side of the work, draws the sheets or work together, and them expands the tubular rivet against the hole in the sheet or work and substantially simultaneously the said blind head is reduced in diameter, or wire drawn, so as to fill tightly the enlarged and expanded passage in the tubular rivet, and then the wire drawing of the stem is continued by pulling the stem until the blind head on the stem is pulled into the rivet to the predetermined extent.

In other words, in a rivet assembly consisting of a tubular rivet with a head on one end and a stem extended through the rivet, said stem having on its blind end a so-called blind head, the stem is pulled through the tubular rivet so as to first expand the tail of the tubular rivet against the corner of the hole or work and draw the work together, then to reduce the diameter of the blind head by wiredrawing it so that it can be pulled into the rivet so as to expand the side walls of the rivet against the hole, and then to further wire draw the blind head of the rivet by continued pull until the entire length of the tubular rivet is expanded against the hole and the drawn or reduced blind head tightly fills the interior of the tubular rivet; then stopping the pull when the wiredrawn portion of the head reaches or passes through the rivet head; the actual rivet assembly is structurally different from previous blind rivet assemblies in that the elongated enlarged blind head on the stem is formed of sufficient length to permit wire drawing into the tubular rivet yet leave an enlarged portion in the expanded tail of the tubular rivet.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 5 is a partly sectional and fragmental view showing a part of the pulling tool applied for shearing off a locking portion on the rivet stem.

Fig. 6 shows a form of the pulling element in the pulling head for such rivet.

Fig. 7 is another form of a pulling head applied to such rivet where the stem is provided with serrations.

Fig. 8 is a perspective view of the relatively movable elements of a pulling device for a rivet stem with a pulling head on it.

Fig. 9 is an assembly of the pulling device for the type of rivets with serrations on the pulling end of the stem.

Fig. 10 is a partly sectional view showing the manner of forming the burr or lock in the rivet head by the form of pulling device shown in Fig. 8, and Fig. 11 is an illustration of the relative position of the stem for forming the burr or lock in the rivet head by the type of upsetting device illustrated in Fig. 9.

Figure 1:
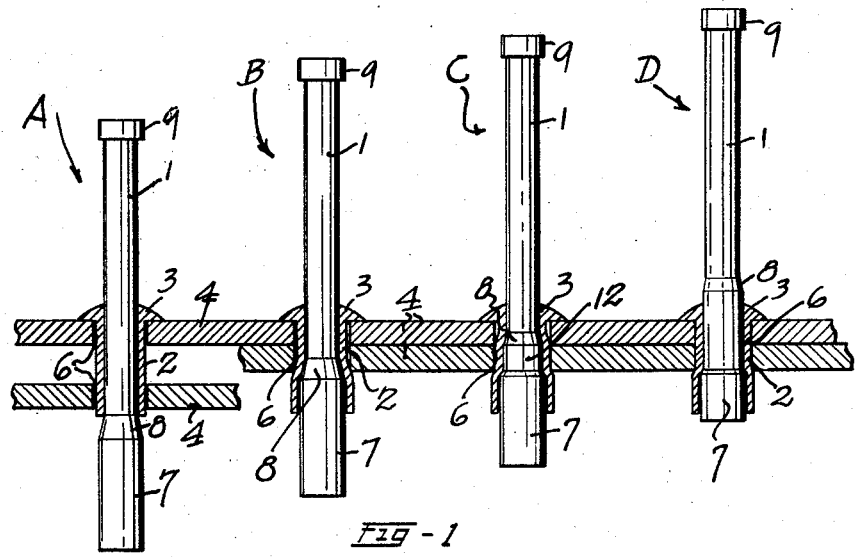
Fig. 1 is a partly sectional view illustrating the steps in riveting and the relative positions of the rivet assembly at certain steps in setting the rivet in the work.

As the first step of the method in the herein improvement of the riveting art, a stem or shank 1 is extended through tubular rivet 2, the head 3 of which latter is adapted to be held against a face of the work, such as a sheet 4, as the tubular rivet 2 is snugly inserted through a hole 6 in the sheets or work 4. On the blind end or tail end of the stem 1 is an enlarged blind head 7 which is preferably elongated and cylindrical. Between the outer periphery of the enlarged head 7 and of the stem 1 is a frusto-conical or tapered connecting or entrance portion 8 to facilitate the initial pulling of the blind head 7 into the tail end of the tubular rivet 2. The stem 1 is provided with any suitable type of means of engagement at its outer or free end to be engaged by a conventional upsetting or pulling tool or pulling head. For instance, in the form shown in Fig. 1 an enlarged engagement head 9 is provided, while in the form illustrated in Fig. 7 the free end 11 of the stem is serrated for engagement by suitable chuck type pulling device. The rivet assembly is first inserted in the work, as shown at "A" in Fig. 1. In the next step, as shown at position "B" in Fig. 1, the rivet head 2 is securely held against the adjacent face of the work 4 while the stem 1 is pulled so as to pull the enlarged head 7 into the tail of the tubular rivet so as to expand the tail of the rivet and force it against the corners of the hole 6 in the inner plate 4 thereby to clinch the plates 4 together tightly. As the enlarged head 7 enters the tail portion of the tubular rivet 2 it expands the tail of the rivet until the plates 4 are tightly clinched together as shown in position "B" in Fig. 1.

In the next step the pulling of the stem 1 is continued and, as indicated at 12, a portion of the enlarged head 7 near the entrance part 8 is wiredrawn by reason of the pull on the stem, shown in position "C" in Fig. 1. Then the pulling of the stem 1 is continued while the rivet head 3 is still held against the work to expand the tubular rivet 2 against the hole 6, and the enlarged head 7 of the stem 1 is further wiredrawn until the connecting part 8 or the reduced portion of the enlarged head is pulled through the rivet head 3 substantially in the position shown in position "D" in Fig. 1. Thereafter the stem may be suitably trimmed so that the projecting end of the stem is trimmed off substantially flush with the rivet head 3.

While the rivet is being thus set, the outer periphery of the stem 1 may be sheared off and swaged into a recess in the rivet head 3, as shown in Fig. 5, thereby firmly locking the rivet stem 1 in place in the rivet head 3.

The structure of the rivet assembly includes the rivet stem shank 1 extended through the tubular rivet 2 so that the free end or the pulling end of the stem 1 projects outside of the head 3 of the tubular rivet 2. An elongated and enlarged blind head 7 on the tail end of the stem 1 is connected by a tapering conical portion 8 to the stem 1. The pulling end or outer projecting end of the stem 1 is provided with either a pulling head 9 for engagement by a pulling tool or with serrations 11, as shown in Fig. 7, to be engaged by a chuck type of pulling tool to be hereinafter described.

Conventional pulling devices are used for installing the rivet. For instance the type of rivet setting device shown in Fig. 8 is particularly adapted for applying and pulling a stem with pulling head 9 thereon. In this case the upset head 13 has an open slot 14 on one side thereof adapted to receive therein the outer projecting portion of the stem 1. The upset head 13 has a tubular body 16 in which latter is slidable a pulling element 17. An open slot 18 in the pulling element 17 is generally in registry with the open slot 14 of the upset head 13 so that the stem 1 may be inserted in both slots 14 and 18 simultaneously. A shoulder 19 formed inside of the pulling element 17 is so arranged as to be engaged by the base of the pulling head 9 on the stem 1 when the stem is inserted in the device.

Suitable mechanisms may be provided for simultaneously holding the upset head 13 against the rivet head 3 while the pulling element 17 is pulled so as to pull the stem 1 into the tubular rivet 2 as heretofore described.

For the stem locking feature it is preferable that a recess 21 be provided in the rivet head 3 for receiving swaged or shaved material from the rivet stem. For this purpose, the outer end of the open slot 14 is made smaller than the extruded or wiredrawn diameter of the rivet stem 1 but larger than the tapering connecting portion 8 of the rivet stem 1. Thus as the stem 1 is pulled through, and as the connecting portion 8 and the extruded or elongated part of the enlarged head 7 are pulled into the slot 14, material from opposite sides of the extruded stem is shaved off by the opposite edges of the slot 14, as shown in Fig. 10, and the material so sheared off is swaged into the recess 21 to form a lock 22 as shown in Fig. 5.

The type of rivet stem which is provided with serrated pulling end 11, shown in Fig. 7, is usually pulled by a chuck-type pulling element in which jaw members 23 are pressed tightly together against the serrations 11 by a tapered seat 24 in the pulling element 26 as the same is pulled. As shown in Fig. 9, this pulling element 26 is slidable in the cylindrical body portion 27 extended from an upset head 28, a hole 20 of which latter accommodates the stem 11 for insertion. The stem 11 is inserted through the hole 29 and between the jaws 23 in the pulling element 26 and then the pulling element is pulled for tightening the jaws. For forming the lock 22, as heretofore described, the hole 29 is made smaller than the wiredrawn diameter of the blind head 7 or the connecting tapered portion 8 so that material is sheared off from all around that portion of the stem, as shown in Fig. 11, and the material so shaved off from the tapered portion 8 and from the extruded or reduced portion of the enlarged head 7 is swaged into the recess 21 to form the lock 22 as shown in Fig. 5.

Figure 3:
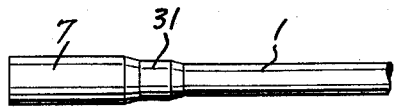
Fig. 3 is a fragmental view of a modified form of the rivet stem in accordance with the herein invention.

The rivet stem form shown in Fig. 3 is a modified form of the previously described rivet stem in that a portion 31 of the blind head is performed to a size which will always pass through a rivet hole without being wiredrawn or deformed. This reduced portion 31 will furnish the material to be sheared off and swaged for forming the lock 22 in the manner heretofore described irrespective of how much of the enlarged head 7 may be reduced and pulled through the tubular rivet 2.

Figure 4:
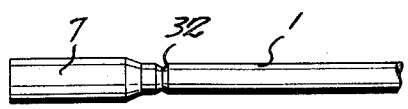
Fig. 4 is another modified form of the rivet stem of this invention with provision for a break-notch.

The modified form of the stem shown in Fig. 4 is preferably used in connection with the type of stem which has a pulling head 9 and is provided with a weakened portion or groove 32 which determines the distance at which the pulling action should cease. As the stem is pulled through the work it is pulled until the groove 32 is approximately flush with the top of the head 3 of the tubular rivet 2. Then the stem could be broken off by merely bending the portion of the stem which projects beyond the groove 32 and thereby the necessity for special trimming tools may be eliminated.

Figure 2:
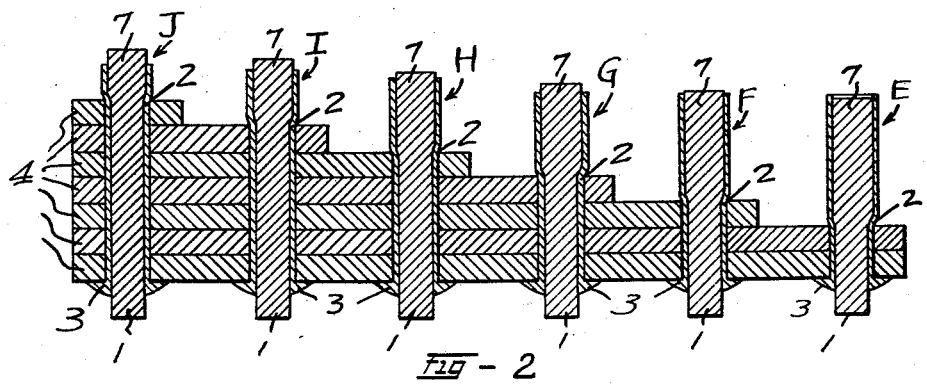
Fig. 2 is a sectional view showing the rivets applied to work of various thicknesses.

The enlarged cylindrical blind head 7 is of sufficient length to permit its wire drawing or reduction and extension through the entire length of the tubular rivet, yet leave sufficient blind enlarged end to remain engaged within the enlarged tail of the tubular rivet. Thus firm installation, filling of the holes in the work and increased structural strength is accomplished. For instance, in viewing in Fig. 2, the thickness of the work at position "E" contains only two plates and only a comparatively small portion of the enlarged head 7 has to be wiredrawn for filling the entire length of the tubular rivet in the hole. At position "F" the same rivet is shown installed in three plate thicknesses and correspondingly larger portion of the enlarged blind head 7 is wiredrawn to cause the tubular rivet to fill the hole and a correspondingly smaller enlarged portion remains in the enlarged tail of the tubular rivet 2. At position "G" the same rivet assembly is applied into a four plate thickness. At position "H" again the same rivet is applied in a work of five plate thickness. At position "I" the identical rivet is applied in a work of six plate thicknesses. At position "J" the identical rivet is applied in a seven plate thickness. It is to be observed that the remaining enlarged blind head portion of the stem in the tail of the tubular rivet is in proportion decreased as more of the enlarged head is wiredrawn into the tubular portion of the tubular rivet for expanding it against the walls of the hole in all the plates securely. This illustrates the use and firm riveting arrangement of the same rivet in works of various thicknesses without sacrificing strength. This result is accomplished primarily by the relative diameter and length of the enlarged blind head in relation to the tail of the tubular rivet.

The method and rivet herein accomplish controlled expansion of the tail of the rivet and high clinching ability, the efficient use of one size of rivet over a wider range of work thickness; positive hole filling by the rivet without the need for closely controlled hole size; positive locking of the stem; and facility of inspection from the visible side of the work.

I claim:
1. A rivet assembly for tightly securing plates together under stress of use, said rivet assembly including a tubular rivet for snugly fitting into aligned holes in the plates to be riveted, said tubular rivet having a shank and a head on one end of the shank and a tail on the other end of said shank, said shank and said tail being of substantially the same outer diameter throughout their entire combined length and of smaller diameter than said head, a stem extending through said tubular rivet tail, shank and head, said stem consisting of a pulling portion extending beyond said head and being readily slidable through said tubular rivet, and an elongated and radially enlarged blind head extending beyond the blind end of said pulling portion, said blind head being of substantially uniform diameter throughout its length, and a joining portion between said pulling portion and said blind head, said joining portion tapering outwardly from said pulling portion to said enlarged blind head and being adjacent the tail of said tubular rivet, the angle of said taper and said substantially uniform blind head diameter and the wiredrawability of said tapered portion and said substantially uniform blind head being such that with the rivet snugly fitting into the aligned holes the tapered joining portion, upon reaching the region of the adjacent plate, will fully clinch the plates and completely expand the rivet tail against the corners of the hole in the adjacent plate in a single head-forming operation to the finished size of said clinching tail, and after said clinching and complete tail formation said tapered joining portion and blind head will be wiredrawn as said joining portion and said blind head are pulled into and through said tubular rivet for expanding the shank of the latter tightly against the sides of said holes in said plates.

2. The invention as defined in claim 1, wherein said enlarged blind head is of such length relative to the interior diameter and length of the tubular rivet as to be wiredrawable to fill the entire length of the tubular rivet and leave an enlarged portion in the expanded tail to maintain the tail in its expanded condition.

3. A method of riveting which includes the steps of snugly inserting through aligned holes in plates a tubular rivet having a stem extending said rivet, said tubular rivet having a shank and a head on one end of the shank and a tail on the other end of said shank, said shank and said tail being of substantially the same outer diameter throughout their entire combined length and of smaller diameter than said head, a stem extending through said tubular rivet tail, shank and head, said stem consisting of a pulling portion extending beyond said head and being readily slidable through said tubular rivet, and an elongated and radially enlarged blind head extending beyond the blind end of said pulling portion, said blind head being of substantially uniform diameter throughout its length, and a joining portion between said pulling portion and said blind head, said joining portion tapering outwardly from said pulling portion to said enlarged blind head and being adjacent the tail of said tubular rivet, the angle of said taper and said substantially uniform blind head diameter and the wiredrawability of said tapered portion and said substantially uniform blind head being such that with the rivet snugly fitting into the aligned holes the tapered joining portion, upon reaching the region of the adjacent plate, will fully clinch the plates and completely expand the rivet tail against the corners of the hole in the adjacent plate in a single head-forming operation to the finished size of said clinching tail; holding said rivet head against the plates, pulling the pulling portion of said stem through a sharp-edged guide adjacent said rivet head, said guide being of no larger a diameter than to snugly fit said pulling portion, and expanding said rivet tail by pulling said tapered portion and said enlarged head into said tail, then by further pulling the stem wiredrawing said enlarged portion through said tubular rivet and through said head to a diameter larger than said sharp-edged guide thereby causing said sharp-edged guide to shear off material from said wiredrawn enlarged head and swage said material into said rivet head.

References Cited in the file of this patent

UNITED STATES PATENTS

| | | |
|---|---|---|
| 1,896,028 | Burvenick | Jan. 31, 1933 |
| 2,372,222 | Mullgardt | Mar. 27, 1945 |
| 2,405,898 | Milone et al. | Aug. 13, 1946 |
| 2,464,405 | Knauf | Mar. 15, 1949 |
| 2,466,811 | Huck | Apr. 12, 1949 |
| 2,467,610 | Cherry | Apr. 19, 1949 |
| 2,501,567 | Huck | Mar. 21, 1950 |
| 2,531,270 | Hood | Nov. 21, 1950 |
| 2,635,501 | Eichner | Apr. 21, 1953 |
| 2,691,915 | Cherry | Oct. 19, 1954 |

FOREIGN PATENTS

| | | |
|---|---|---|
| 139,786 | Australia | Dec. 10, 1934 |
| 531,125 | Great Britain | Dec. 30, 1940 |
| 596,275 | Great Britain | Dec. 31, 1947 |